(12) United States Patent
Ambrose et al.

(10) Patent No.: US 8,380,871 B1
(45) Date of Patent: Feb. 19, 2013

(54) EFFICIENT DELAYED OVERHEAD PROCESSING TECHNIQUES

(75) Inventors: Desmond Ambrose, Ottawa (CA); Glenn Henshaw, Carp (CA)

(73) Assignee: Altera Corporation, San Jose, CA (US)

(*) Notice: Subject to any disclaimer, the term of this patent is extended or adjusted under 35 U.S.C. 154(b) by 109 days.

(21) Appl. No.: 12/409,365

(22) Filed: Mar. 23, 2009

Related U.S. Application Data

(63) Continuation of application No. 10/340,869, filed on Jan. 10, 2003, now abandoned.

(51) Int. Cl.
*G06F 15/16* (2006.01)
(52) U.S. Cl. ........................................ 709/236
(58) Field of Classification Search .................. 709/236
See application file for complete search history.

(56) References Cited

U.S. PATENT DOCUMENTS

| | | | | |
|---|---|---|---|---|
| 5,383,196 A | * | 1/1995 | Morton | 714/712 |
| 2002/0107975 A1 | * | 8/2002 | Patel et al. | 709/236 |
| 2003/0198232 A1 | * | 10/2003 | Denton | 370/395.52 |

OTHER PUBLICATIONS

Synchronous Optical Network (SONET) Tutorial, Aug. 3, 2000. Retrieved from the Internet <http://www.onforum.com/tutorials/sonnet/index.html>, topics 1-10, 48 pages.*

Synchronous Optical Network (SONET) Tutorial, Aug. 3, 2000, (retrieved from the internet on Aug. 27, 2003), http://www.onforum.com/tutorials/sonet/index.html, topics 1-10, 48 pages.

* cited by examiner

*Primary Examiner* — Barbara Burgess
(74) *Attorney, Agent, or Firm* — Ropes & Gray LLP

(57) ABSTRACT

Techniques for processing overhead bytes in SONET or SDH frames are provided. Memory stores overhead bytes from the SONET (or SDH) frames. One or more processors load the overhead bytes from the memory. The one or more processors can process the overhead bytes away from the data path at a slower data rate than the data rate of data on the data path. By processing the overhead bytes at a slower data rate, less circuitry is needed to process the overhead bytes. Bytes on the data path are stored in a first-in-first-out delay buffer, while the overhead bytes are processed away from the data path, to maintain alignment between output signals of the processors and bytes on the data path.

24 Claims, 1 Drawing Sheet

EFFICIENT DELAYED OVERHEAD PROCESSING TECHNIQUES

CROSS REFERENCE TO RELATED APPLICATIONS

The present application is a continuation of U.S. application Ser. No. 10/340,869, filed Jan. 10, 2003, and is incorporated herein for all purposes.

BACKGROUND OF THE INVENTION

The present invention relates to techniques for processing overhead bytes in a SONET or an SDH frame, and more particularly, to techniques for processing overhead bytes in a SONET or SDH frame away from the data path.

Synchronous optical network (SONET) and Synchronous Digital Hierarchy (SDH) are standards for data transmission across optical telecommunications networks. Data bits that are transmitted according to a SONET or an SDH standard are grouped into frames. The data bytes typically contain 8 data bits. The data bytes are typically grouped into words for internal processing. Any number of bits and bytes can form a word (e.g., 64 bits/8 bytes per word).

Each frame contains an overhead section and a payload section. The overhead section includes bits specified by a SONET protocol. The overhead section includes information that allows communications between an intelligent network controller and the individual nodes in the network. For example, the first two bytes (A1 and A2) in a frame are used to indicate the beginning of a SONET frame. The payload section includes the data bits that are being transferred from one location to another.

An STS-1 pointer (H1 and H2 bytes) allows the synchronous payload envelope (SPE) to be separated from the transport overhead bytes. The pointer is an offset value that points to the byte where the SPE begins. If there are any frequency or phase variations between the STS-1 frame and its SPE, the pointer value will be increased or decreased accordingly to maintain synchronization.

In prior art systems, the pointers and other overhead bytes are processed on the data path at the same data rate as data on the data path. The overhead bytes were processed using round-robin pipelined (time-sliced), replicated functions. Results are obtained every clock cycle and stored in pipelined flip-flops, or RAM, according to well known pipelining techniques.

Prior art systems used a substantial amount of circuitry to implement pipelining and replication to process the overhead bytes at the same data rate as the data path. Therefore, it would be desirable to provide techniques for processing overhead bytes in SONET frames that use less circuitry and provide more flexibility.

BRIEF SUMMARY OF THE INVENTION

The present invention provides techniques for processing overhead bytes of SONET or SDH frames away from the data path. The present invention provides memory for storing overhead bytes in a SONET or an SDH frame. One or more processors process overhead bytes away from the data path at a slower data rate than the data path data rate by loading the overhead bytes from memory. The techniques of the present invention reduce the amount of circuitry needed to process overhead bytes in the frames, because the processors do not use high speed pipelined or replicated architectures.

Bytes on the data path are stored in a first-in-first-out (FIFO) delay buffer, while the pointer bytes are processed away from the data path. The data bytes are stored in the FIFO buffer so that the output of the pointer processing stages is aligned with bytes on the data path.

According to one embodiment, the present invention provides greater flexibility, if the overhead processing functions are performed by a general purpose microprocessor. Because the overhead processing functions are not hardwired into specific circuitry, it is easier to modify the processing functions for different SONET and SDH applications by rewriting software code.

DETAILED DESCRIPTION OF THE INVENTION

Figure 1:
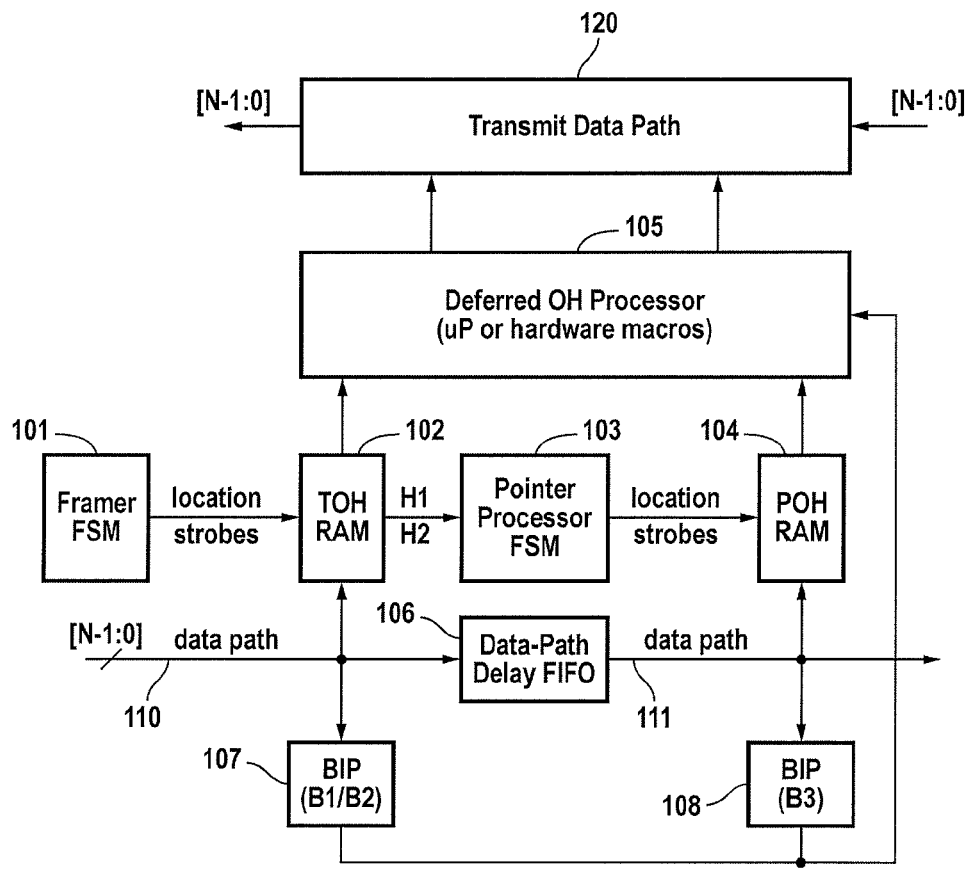
FIG. 1 illustrates a block diagram of a processing system that processes most overhead bytes away from the data path in accordance with the principles of the present invention.

FIG. 1 illustrates an overhead processing system that processes overhead bytes in SONET and SDH frames according to the present invention. For simplicity, all modules that may exist in the overhead processing system are not shown in FIG. 1. Only the modules that are required to illustrate the operation of the present invention are shown in FIG. 1.

The present invention is described primarily in the context of the SONET standard for illustrative purposes only. It should be understood that the techniques and principles of the present invention apply equally to data transfer using the Synchronous Digital Hierarchy (SDH) standard. The techniques of the present invention can be used for processing overhead according to the SDH standard. Although the terminology for SONET and SDH standards differ, the function of these two standards is almost identical. For example, SONET and SDH include overhead bytes that perform similar functions.

The processing system of FIG. 1 receives data bytes in SONET frames on data path 110. The processing system receives data signals as words containing N parallel bits that are numbered from 0 to N−1. Data path 110 contains word aligned data. Data bits on an input data stream are word aligned by using the techniques described in co-pending, commonly assigned U.S. patent application Ser. No. 10/340,203, entitled Techniques for Frame Detection and Word Alignment, to Ambrose et al., filed concurrently herewith, which is incorporated by reference herein.

The boundary between words is defined to coincide with the frame boundary. This implies that all SONET column boundaries are also word boundaries. There are also word boundaries within the column.

Figure 2:
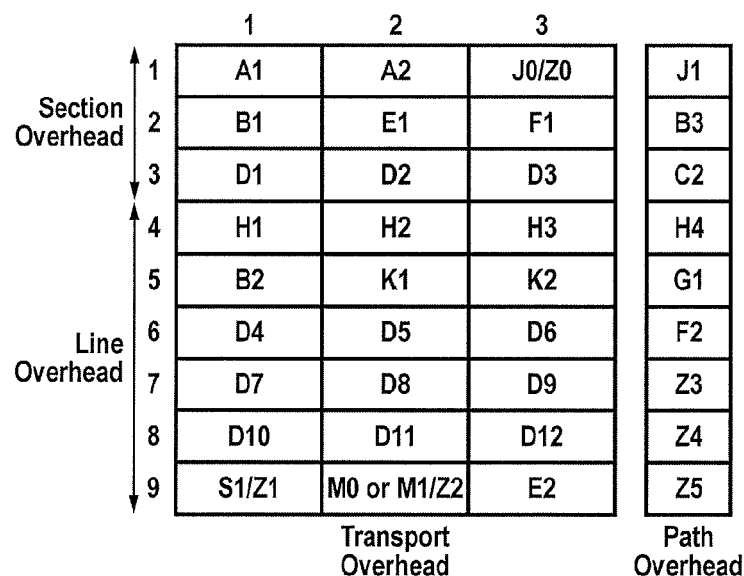
FIG. 2 illustrates a table of the overhead bytes according to an STS-1 SONET frame.

FIG. 2 illustrates a table of the bytes in the overhead section of an STS-1 SONET data frame. Each SONET STS-1 frame includes 9 rows of 90 columns, for a total of 810 bytes. The data bytes are transmitted column by column, row by row from left to right and from top to bottom. The transport overhead section of each frame includes the first three columns of 9 bytes.

The path overhead section of each SPE is located as the first column of the SPE. The path overhead includes 9 bytes. Pointer processing is performed to locate the SPE within a frame. Specifically, the offset between bytes H3 and J1 indicate the offset between the SPE and the transport overhead section.

The bytes of the transport overhead (TOH) section of each SONET frame on data path 110 are stored in TOH random access memory (RAM) block 102. The TOH bytes are located in the first 3 columns of the table in FIG. 2. For STS-1, each column in the TOH section includes 9 bytes (3 section overhead bytes and 6 line overhead bytes).

For STS-N, where N equals, e.g., 3, 12, 24, 48, 192, etc., three times N (3N) columns of TOH bytes are located in each frame. In one embodiment, all of the bytes in the TOH section of a frame are written into the TOH RAM 102. This embodiment allows the greatest amount of flexibility because all TOH bytes are available for processing. In a more efficient embodiment, only the smallest required subset of the bytes in the TOH section of a frame (including bytes H1/H2) are stored in TOH RAM 102 to conserve memory resources.

Framer finite state machine (FSM) 101 outputs location strobe signals that indicate what overhead bytes are on the data path at any given time. For example, the location strobes can indicate when bytes A1 and A2 are on data path 110. The location strobes can be generated, for example, by the frame detection circuitry described in U.S. patent application Ser. No. 10/340,203, mentioned above.

TOH RAM 102 uses the location strobes to generate write enable and write address signals. For example, when TOH RAM 102 receives overhead bytes A1 and A2 at its input, FSM 101 outputs location strobes that indicate the presence of bytes A1 and A2 on data path 110. In response to these location strobes, transport overhead bytes of each frame are written from the data path into designated memory addresses in TOH RAM 102. The location strobes can also indicate the presence of other bytes on data path 110.

All data bytes on data path 110 are stored into memory of a data-path delay first-in-first-out (FIFO) buffer 106. FIFO 106 stores data bytes received on data path 110, while pointer bytes are being processed by processor 103. All of the bytes on data path 110 are stored in FIFO 106 at some point in time. FIFO 106 transfers bytes from path 110 to path 111. Thus, FIFO 106 serially stores bytes on the SONET data path. Bytes on path 111 are sent to another system that processes bytes of the SPE, including the B3 parity byte of the path overhead, and the payload bytes.

Pointer processor FSM 103 processes pointer bytes H1 and H2. Pointer H1 and H2 bytes reside in the fourth row of a TOH section of a SONET frame as shown in FIG. 2. Pointer processor 103 processes pointer(s) H1/H2 according to well-known techniques.

Bytes H1 and H2 allow the synchronous payload envelop (SPE) to be separated from the transport overhead. H1 and H2 point to the byte where the SPE begins, which is the J1 POH byte. If there are any frequency or phase variations between the STS-1 frame and its SPE, the pointer value of H1/H2 is increased or decreased accordingly to maintain synchronization.

Pointer processor 103 processes pointer(s) H1/H2 away from the data path as shown in FIG. 1 using round-robin time sliced functions. Processor 103 loads the H1/H2 pointer bytes from the TOH RAM 102. The only bytes that processor 103 processes are pointer bytes H1/H2. The processing of pointer H1/H2 can be performed at a slower data rate than the data rate of data on data path 110. This technique eliminates the need to process pointer H1/H2 using pipelined and replicated architecture.

Pipelining can be used to process multiple overhead bytes at once using multiple pipelined stages. For example, the processing may require five stages, implying five clock cycles. The pipelined stages break up the pointer processing functions into multiple intermediate functions. Results of each intermediate stage are calculated in every clock cycle and stored in a flip-flop according to pipelining techniques.

The intermediate functions are dependent on each other in the sense that each pipelined intermediate function can be performed only with the results of previous intermediate function(s). Therefore, it takes five clock cycles from the time the first pointer processing is started until the first results are produced, followed by the results of the processing of subsequent pointers every clock cycle until all pointers are processed.

For example, for 12 pointers, the delay from input #1 to output #12 is (5+12) clock cycles. Using the non-pipelined techniques of the present invention, the delay from input #1 to output #12 is (12×5) clock cycles.

The processing steps are replicated using additional circuitry so that multiple lanes of overhead bytes can be processed at the same time. For example, four lanes can be processed for OC-48 using four replicated processing paths, each containing pipelined stages. In this example, there is a lane for every 8 bits of the data path.

In prior art systems, replication and pipelining increases the processing speed and allows pointer H1/H2 to be processed at the data rate of data on data path 110. However, pipelining and replication require a substantial amount of additional circuitry to implement.

According to the techniques of the present invention, pointer processor 103 processes pointer H1/H2 using round-robin, time sliced functions, without using pipelining or replication. Each byte (H1 or H2) received by processor 103 is processed separately in a single (non-replicated, non-pipelined) processing module. The results of pointer processing module are stored in memory during a storage stage. The output of the pointer processing is the offset value of each path's SPE. Processor 103 outputs the offset values as location strobes (see FIG. 1).

Processor 103 uses multiple processing stages, but does not calculate and store complete results every clock cycle. Processor 103 calculates intermediate functions, and stores the results until all subsequent stages have performed their calculation. Intermediate functions performed by processor 103 are dependent on each other. Processor 103 may, for example, process each pointer H/1H2 in five clock cycles.

Processor 103 also does not have multiple replicated processors. Therefore, processor 103 requires substantially less circuitry to process pointer H1/H2 than prior art systems, especially for high numbers of paths such as OC-192.

Processor 103 processes pointer H1/H2 in parallel with the transmission of data along data paths 110 and 111. Processor 103 processes pointer H1/H2 at a slower data rate than the data rate of data on the data path, because it does not use multiple pipelined and replicated modules. Because processor 103 only processes pointer H1/H2, and the processing time for processing these bytes is deterministic (e.g., five clock cycles), the latency between the first pointer being present on path 110, and the last pointer being processed by processor 103, is a fixed amount of time.

Data bytes on the data path are stored in FIFO 106, while pointer processor 103 processes bytes H1 and H2. The data storage depth of FIFO 106 has to be large enough to store enough bytes on the data path so that when pointer processor 103 is finished processing bytes H1/H2, FIFO 106 outputs byte H3. Therefore, data storage depth of FIFO 106 is set by the speed of processor 103.

Byte H3 appears on data path 111 after processor 103 has processed pointer H1/H2. Byte H3 is available on path 111 to be used, e.g., for negative byte stuffing if the output of processor 103 indicates that negative byte stuffing is needed.

The data rate of data entering FIFO 106 is the same as the data rate exiting FIFO 106. Thus, FIFO 106 does not slow down the data rate of data on data path 111. FIFO 106 stores bytes on the data path so that bytes on data path 111 (e.g., byte H3) are aligned with the processing of pointers H1/H2. FIFO 106 delays the transmission of bytes onto data path 111 to provide processor 103 enough time to process pointer H1/H2, while maintaining the same data rate on paths 110 and 111.

The delay (data storage depth) of the data path delay FIFO 106 is many times greater than the delay (flip-flops) in pipelined and replicated systems. FIFO 106 introduces a small amount of extra delay into the data path, from approximately 50 nanoseconds for one pointer to approximately ten microseconds for 192 pointers. However, the extra delay added by the increased depth of FIFO 106 in the present invention is negligible for most design systems.

According to another embodiment of the present invention, the memory element of FIFO 106 can be used to implement a clock domain boundary with pointer (re)generation, and/or part or all of an STS-1 cross connect. This embodiment uses the same RAM and has the same delay as the previous embodiment, but uses additional logic circuitry. This embodiment eliminates the need for an additional memory element that is used in typical systems.

Circuit modules that are not shown in FIG. 1 are used to produce location strobes for path overhead (POH) RAM 104. These modules are coupled between processor 103 and RAM 104. These modules may exist as one instance for single path configurations, or may be replicated as often as every 8 bits of data path 111 for multiple path configurations.

For example, OC-192 may carry one STS-192c path. In this example, the module exists as a single instantiation aligned with the most significant 8 bits of the data path. In another example, OC-192 carries 192 STS-1 paths. In this case the module is replicated 8 times aligned with each 8 bits of the data path.

The path overhead location strobes provided by the module(s) to POH RAM 104 indicate when the path overhead bytes (see the fourth column of FIG. 2) are present on data path 111. POH RAM block 104 stores the path overhead bytes in memory. POH RAM block 104 uses the path overhead location strobes to generate write enable and write address signals that are used to store the path overhead bytes in memory.

FIFO 106 aligns path overhead bytes on the data path with the path overhead location strobes that are generated after pointer processing. Thus, FIFO 106 delays data on the data path so that the path overhead (POH) bytes are at the input of RAM 104 when the path overhead location strobe signals are sent to RAM 104.

Bit interleaved parity (BIP) blocks 107 and 108 check for bit errors in data paths 110 and 111, respectively, using XOR functions. The details of how BIP blocks 107 and 108 check for bit errors on the data paths are well known to those of skill in the SONET data transmission art. For example, BIP blocks 107-108 can perform BIP processing using pipelined and replicated functions that obtain results every clock cycle according to well known techniques.

BIP blocks 107-108 perform calculations that are updated every clock cycle of the frame. Therefore, BIP blocks 107-108 perform the BIP calculations on the data path. For byte B2 and multi-path bytes B3 for OC greater than 1, the calculations are round-robin time sliced and use RAM to store state.

Deferred overhead processor 105 in FIG. 1 processes other transport and path overhead bytes that were not processed by other blocks. Thus, processor 105 processes transport and path overhead bytes, except bytes A1, A2, H1, and H2. Processor 105 receives the transport and path overhead bytes from TOH RAM 102 and POH RAM 104 as shown in FIG. 1. Deferred overhead processor 105 also receives framer state information from framer 101 and single frame BIP error counts from BIP blocks 107 and 108.

Processor 105 processes overhead bytes away from the data path, possibly at a slower clock rate than the clock rate of data on the data paths 110/111. For example, if the clock rate of data on the data paths is 155 MHz, processor 105 may operate at 50 MHz. By operating at a slower clock rate, processor 105 is able to process the overhead bytes using circuitry that is less optimized for performance. For example, processor 105 may use less circuitry or less resources to process overhead bytes at a slower clock rate.

Processor 105 can process a subset of the overhead bytes of a frame within the 125 microsecond interval of that frame. Another subset of the overhead may be processed over a longer period, perhaps up to 30 seconds. Another subset of the overhead may be processed on demand of an external processor. Another subset of the overhead may be ignored completely. Another subset of overhead may be processed in a hard macro block designed by a user (e.g., the B1 block 107).

Processor 105 can perform any desired overhead processing functions using the overhead bytes. For example, processor 105 can perform error monitoring and detection functions. Examples of the functions that processor 105 can perform include Bit Error Rate Monitoring (BERM), Remote Error Indication (REI), REI generation, filtering (overhead consistency checks), and Remote Defect Indication generation, all of which are well-known to those of skill in the SONET data transmission art.

Processor 105 can also perform large long-term accumulation of Bit Interleaved Parity (BIP) using output signals from BIP blocks 107-108 as shown in FIG. 1. This function is also well known to those of skill in the art. Processor 105 can perform any of these functions as well as other error monitoring and detection functions.

Processor 105 is an interrupt driven module. The interrupts are generated by location strobes from transport and path modules and are transmitted to processor 105. The interrupts indicate to processor 105 when to load a new set of transport and path overhead bytes from TOH RAM 102, POH RAM 104, or state information from framer block 101 and BIP blocks 107/108. Thus, the interrupt signals indicate that particular overhead bytes have been loaded into RAM 102 and 104.

For multiple path configurations, multiple path overhead columns are present in each frame. For example, for OC-12 carrying 12 STS-1, there are 12 path overhead columns, each with 9 bytes of data.

Systems of the present invention can store information indicating the order in which paths were received by the overhead processing system of FIG. 1 in a multi-path configuration. Information indicating the order the paths were received can be maintained as a queue. Processor 105 uses the information stored in the queue to process overhead bytes for each path in the order in which the paths were received by the overhead processing system.

The queue can be stored in POH RAM 104. POH RAM 104 stores 9 bytes of data per path. As an example, there may be 7 bytes of unused RAM (16 bytes total—9 used bytes) available in POH RAM 104 for each path. In one embodiment, the queue is stored in this extra space in POH RAM 104.

Another use of the remaining 6 bytes (7 bytes—1 byte for the queue) is to duplicate some of the path overhead (POH) at the time a path is en-queued. For example, each path is en-queued every 125 microseconds, but a portion (1 byte) is updated about every (125/9=) 14 microseconds. By duplicating the storage of some of the POH bytes, the required response time of processor 105 is increased from 14 microseconds up to (125×6/9=) 83 microseconds.

Processor 105 reads the transport and path overhead bytes from RAM blocks 102 and 104 or a status register (SEF, LOF, LOS, BIP, etc.) and stores the bytes in processor memory. In an alternative embodiment, overhead bytes are loaded directly from RAM 102/104 or a status register (SEF, LOF, LOS, BIP, etc.) to the processor 105 registers, skipping the step of storing the overhead bytes in processor memory until processing is complete.

SEF stands for severely error frame. It is an indication that the aligned data path A1/A2 bytes no longer appear to be the proper framing bytes, indicating either a bit error, or that frame alignment has changed. LOF stands for Loss of frame. After several SEF indications, LOF is declared, and the framer FSM 101 starts a new search for frame in the unaligned data path input. LOS stands for loss of signal. If there is a long period of time (some microseconds) during which the data path carries only zero, then loss of signal is declared.

Processor 105 loads one or more the overhead bytes from the processor memory and performs the overhead processing functions. Processor 105 stores results of the overhead processing functions in the processor memory. Processor 105 may write the results of the overhead processing functions back into a data path register (e.g., as an alarm indication signal) or into the transmit data path 120 (such as remote error detection (REI), RDI, or trace). The alarm indication signal indicates to the next processor that certain data has errors.

REI is remote error indication. REI is transmitted in the G1 and M0/M1 bytes (see FIG. 2). A receiver both generates and monitors these overhead bytes. When a receiver receives some number of B2 or B3 BIP errors, it relays that number back to the transmitter to insert into the REI overhead. It also reads the REI fields of the incoming G1 and M0/M1 bytes, and counts the number of BIP errors that were received at the far end (the other end of the fiber).

RDI is also a relay function for end to end monitoring. But instead of BIP, RDI sends messages related to other overhead processing, such as the framer FSM state or trace state. There is a section trace and a path trace. The trace is a message, in ASCII text, that is either 16 or 64 bytes in length, which is used to label the connection.

The functions performed by processors 103 and 105 can be performed by one or more general purpose microprocessors (μP). A microprocessor provides a substantial amount of flexibility. The microprocessors can be configured using software source such as C source code. The source code can be supplied to a user so that the user can modify overhead functions performed by processors 103 and 105, or add new overhead functions. Providing this type of flexibility adds substantial value for users.

In one embodiment, the one or more microprocessors that perform the functions of processors 103 and 105 may be ASIC microprocessors. In other embodiments, these microprocessors may be implemented by a programmable integrated circuit by programming a subset of the logic elements in the programmable IC. Programmable ICs include programmable logic devices (PLD), field programmable gate arrays (FPGA), and programmable logic arrays (PLA). In general, an ASIC processor uses less circuitry than a programmable IC.

In further embodiments, some or all of blocks 101-108 and 120 in FIG. 1 are implemented by configuring programmable circuit elements in a programmable integrated circuit.

Using only microprocessors to perform the functions of processors 103 and 105 is preferable for configurations that have few paths, but not for configurations that have more than a few paths. While 125 microseconds may be enough time to process particular portions of the transport overhead and a few paths, the microprocessor is not able to perform many functions per path when 192 or even 48 paths require service.

For configurations that have many paths such as OC-192, some or all of the functions of processors 103 and 105 are preferably performed by dedicated hardware macros to reduce the processing time. Hardware macros include hardwired circuitry that performs specific functions required by the overhead processing system of FIG. 1.

Because hardware macros comprise circuitry that is hardwired to perform specific functions, the flexibility of this circuitry is limited. However, hardware macros may require less die area and may be faster than general purpose microprocessors for performing the functions of the overhead processing system of FIG. 1.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. For example, the present invention encompasses any SONET standard rate and path configuration such as STS-1, STS-3, STS-12, STS-24, STS-48, STS-192, etc. The present invention also includes processing overhead in SDH frames. It is intended that the invention not be limited to the particular embodiment disclosed, but that the invention will include all embodiments and equivalents falling within the scope of the claims.

What is claimed is:

1. A method comprising:
  receiving, on a data path, a frame comprising transport overhead bytes, path overhead bytes, and payload bytes;
  processing the transport overhead bytes using processing circuitry to determine location of the path overhead bytes, wherein the processing of the transport overhead bytes to determine the location of the path overhead bytes occurs at a first data rate that is slower than a second data rate of data on the data path;
  wherein the transport overhead bytes include a pointer, and wherein processing the transport overhead bytes to determine the location of the path overhead bytes further comprises:
  processing the pointer to determine the location of the path overhead bytes; and
  reading the path overhead bytes from the frame based at least in part on the determined location of the path overhead bytes.

2. The method of claim 1, further comprising:
  storing the transport overhead bytes of the received frame in a first memory; and
  storing the path overhead bytes of the received frame in a second memory, wherein:
  a first processor processes the pointer, a second processor processes a subset of the transport and path overhead bytes, the subset of the overhead bytes not including the pointer, the pointer is loaded into the first processor from the first memory, and the subset of the transport and path overhead bytes are loaded into the second processor from the first memory and the second memory.

3. The method of claim 2, wherein the first and the second processors are general purpose microprocessors.

4. The method of claim 1, wherein processing the transport overhead bytes further comprises:
processing the transport overhead bytes using dedicated hardware macros.

5. The method of claim 1, further comprising:
storing the transport overhead bytes of the received frame in a first memory;
storing the path overhead bytes of the received frame in a second memory;
generating first interrupt signals for indicating that subsets of the transport overhead bytes have been loaded into the first memory; and
generating second interrupt signals for indicating that subsets of the path overhead bytes have been loaded into the second memory.

6. The method of claim 5, further comprising:
loading the subsets of the transport overhead bytes into a processor in response to the first interrupt signals; and
loading the subsets of the path overhead bytes into the processor in response to the second interrupt signals.

7. The method of claim 1, further comprising:
storing bytes of the frame received on the data path in a first-in-first-out storage circuit.

8. The method of claim 7, wherein the transport overhead bytes include first and second bytes that comprise a pointer and a third byte that follows the second byte in the data path, and wherein processing the transport overhead bytes further comprises:
processing the pointer to determine the location of the path overhead bytes.

9. The method of claim 8, wherein the first-in-first-out storage circuit is operable to delay bytes on the data path until the first-in-first-out storage circuit outputs the third byte after a processor has finished processing the pointer.

10. The method of claim 1, further comprising:
storing the transport overhead bytes of the received frame in a first memory;
storing the path overhead bytes of the received frame in a second memory;
generating first location strobes to indicate that the transport overhead bytes are accessible by the first memory; and
generating second location strobes to indicate that the path overhead bytes are accessible by the second memory.

11. The method of claim 10, wherein:
storing the transport overhead bytes in the first memory is in response to the first location strobes; and
storing the path overhead bytes in the second memory further is in response to the second location strobes.

12. The method of claim 1, wherein:
the received frame is a Synchronous Optical Networking (SONET) frame.

13. The method of claim 1, wherein:
the received frame is a Synchronous Digital Hierarchy (SDH) frame.

14. A system comprising:
memory operable to store the overhead bytes, the overhead bytes including a pointer;
a buffer coupled in series with the data path that is operable to store bytes on the data path;
first processing circuitry coupled to the memory and operable to receive the pointer from the memory, the first processing circuitry operable to process the pointer at a first data rate that is slower than a second data rate of the bytes on the data path to locate payload envelopes of the frames; and
second processing circuitry operable to process at least a subset of the overhead bytes received from the memory.

15. The system of claim 14, wherein the memory comprises:
a first memory circuit operable to store transport overhead bytes received from the data path; and
a second memory circuit operable to store path overhead bytes received from the buffer.

16. The system of claim 15, further comprising:
first modules operable to provide location strobes to indicate that the transport overhead bytes are accessible by the first memory; and
second modules operable to indicate that the path overhead bytes are accessible by the second memory.

17. The system of claim 15, wherein the second processing circuitry is operable to receive a subset of the transport overhead bytes from the first memory circuit and a subset of the path overhead bytes from the second memory circuit, and the second processing circuitry is operable to process the subset of the transport overhead bytes and the subset of the path overhead bytes.

18. The system of claim 14, further comprising:
error detection circuitry operable to check for bit errors in the bytes on the data path using select bytes from among the overhead bytes.

19. The system of claim 14, wherein the first and the second processing circuitry comprise microprocessors.

20. The system of claim 14, wherein the first and the second processing circuitry comprise dedicated hardware macros.

21. The system of claim 14, wherein the buffer is a first-in-first-out buffer, and the buffer outputs the bytes at the second data rate.

22. The system of claim 14, wherein received frames include multiple paths, and the memory is operable to store a queue that keeps track of the order that the system received the paths.

23. The system of claim 14, wherein the second processing circuitry is operable to process the subset of the overhead bytes received from the memory at a third data rate that is slower than the second data rate.

24. The system of claim 14, wherein the first processing circuitry does not use pipelining or replication to process the pointer.

* * * * *